US012767242B2

(12) United States Patent
Hemphill et al.

(10) Patent No.: US 12,767,242 B2
(45) Date of Patent: Oct. 20, 2026

(54) TORSION ROD ANCHOR FOR VEHICLE TAILGATE ASSEMBLY

(71) Applicant: Ford Global Technologies, LLC, Dearborn, MI (US)

(72) Inventors: Joshua Robert Hemphill, White Lake, MI (US); Joseph Prior, Detroit, MI (US); Raul Ezequiel Alvarez Ruiz, Estado de Mexico (MX); Michael Shawn Watterworth, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 503 days.

(21) Appl. No.: 18/357,551

(22) Filed: Jul. 24, 2023

(65) Prior Publication Data

US 2025/0033709 A1 Jan. 30, 2025

(51) Int. Cl.

*B62D 33/027* (2006.01)
*B62D 33/03* (2006.01)
*E05F 1/12* (2006.01)

(52) U.S. Cl.

CPC ......... *B62D 33/0273* (2013.01); *B62D 33/03* (2013.01); *E05F 1/1238* (2013.01)

(58) Field of Classification Search

CPC .. B62D 33/0273; B62D 33/027; B62D 33/03; E05Y 2900/544; E05F 1/1238
USPC ........................................... 296/50, 51, 57.1
See application file for complete search history.

(56) References Cited

U.S. PATENT DOCUMENTS

| | | | | | |
|---|---|---|---|---|---|
| 5,116,096 | A | 5/1992 | Taylor | | |
| 6,182,596 | B1 * | 2/2001 | Johnson | B63B 1/22 | 114/284 |
| 6,769,729 | B1 * | 8/2004 | Bruford | B62D 33/03 | 49/386 |
| 7,281,746 | B2 * | 10/2007 | Austin | B60P 1/267 | 296/57.1 |
| 8,136,862 | B2 * | 3/2012 | Bator | B62D 33/0273 | 296/57.1 |
| 8,740,279 | B1 * | 6/2014 | McGoff | B62D 33/0273 | 49/168 |
| 9,822,574 | B2 | 11/2017 | Heiberger et al. | | |
| 11,505,261 | B2 * | 11/2022 | Van Norman | B62D 33/037 | |

(Continued)

FOREIGN PATENT DOCUMENTS

| | | | |
|---|---|---|---|
| CN | 207291621 | U | 5/2018 |
| DE | 202014102933 | U1 | 10/2015 |

(Continued)

OTHER PUBLICATIONS

CN 121492608 with computer translation (Year: 2026).*

*Primary Examiner* — Gregory A Blankenship
(74) *Attorney, Agent, or Firm* — Vichit Chea; Carlson, Gaskey & Olds, P.C.

(57) ABSTRACT

A tailgate assembly includes a frame subassembly for a tailgate. The frame subassembly has a first brace placed adjacent to a second brace to provide a connection beam with a hollow structural section. The assembly further includes a torsion rod and a torsion rod anchor. The torsion rod is at least partially disposed within the hollow structural section. The torsion rod anchor has a rod-receiving opening that receives an end portion of the torsion rod to anchor the end portion of the torsion rod.

17 Claims, 7 Drawing Sheets

(56) References Cited

U.S. PATENT DOCUMENTS

| | | | | |
|---|---|---|---|---|
| 2004/0178651 | A1* | 9/2004 | Austin | E05D 7/1066 296/57.1 |
| 2004/0183326 | A1 | 9/2004 | Tegtmeier | |
| 2004/0262938 | A1* | 12/2004 | Bruford | B62D 33/0273 296/50 |
| 2006/0001287 | A1 | 1/2006 | Plett et al. | |
| 2006/0082181 | A1* | 4/2006 | Austin | B62D 33/03 296/57.1 |
| 2006/0214445 | A1 | 9/2006 | Austin | |
| 2007/0096492 | A1* | 5/2007 | Austin | E05D 11/084 296/57.1 |
| 2007/0152471 | A1* | 7/2007 | Zagoroff | B62D 33/03 296/57.1 |
| 2008/0277960 | A1* | 11/2008 | Zagoroff | B62D 33/03 296/57.1 |
| 2012/0042109 | A1* | 2/2012 | Schier | H04L 12/40032 710/305 |
| 2012/0324793 | A1* | 12/2012 | Abbasi | B62D 33/0273 49/168 |
| 2020/0095816 | A1* | 3/2020 | Townson | B62D 33/0273 |
| 2020/0131827 | A1* | 4/2020 | Townson | E05F 1/1238 |
| 2021/0221448 | A1* | 7/2021 | Hung | B62D 33/0273 |
| 2021/0237808 | A1* | 8/2021 | Ghoukasian | B62D 33/037 |
| 2022/0001728 | A1* | 1/2022 | Nania | B62D 33/0273 |
| 2022/0371667 | A1* | 11/2022 | Hemphill | B62D 33/0273 |
| 2024/0367729 | A1* | 11/2024 | Prior | B62D 33/0273 |
| 2024/0391537 | A1* | 11/2024 | Prior | B62D 33/03 |
| 2024/0409166 | A1* | 12/2024 | Hemphill | B62D 33/0273 |
| 2025/0026415 | A1* | 1/2025 | Borkar | B62D 33/027 |
| 2025/0033709 | A1* | 1/2025 | Hemphill | B62D 33/0273 |
| 2026/0042399 | A1* | 2/2026 | Cho | B60R 3/02 |
| 2026/0042488 | A1* | 2/2026 | Cho | B62D 33/0273 |
| 2026/0042489 | A1* | 2/2026 | Cho | B62D 33/037 |
| 2026/0043290 | A1* | 2/2026 | Cho | B60R 3/02 |

FOREIGN PATENT DOCUMENTS

| | | | |
|---|---|---|---|
| EP | 2524860 | A1 | 11/2012 |
| JP | 2004026054 | A | 1/2004 |
| JP | 2004026055 | A | 1/2004 |
| JP | 2004026056 | A | 1/2004 |

* cited by examiner

TORSION ROD ANCHOR FOR VEHICLE TAILGATE ASSEMBLY

TECHNICAL FIELD

This disclosure relates generally to a tailgate assembly and, more particularly, to anchoring a torsion rod of the tailgate.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

In some aspects, the techniques described herein relate to a tailgate assembly, including: a frame subassembly for a tailgate, the frame subassembly having a first brace placed adjacent to a second brace to provide a connection beam with a hollow structural section; a torsion rod at least partially disposed within the hollow structural section; and a torsion rod anchor having a rod-receiving opening that receives an end portion of the torsion rod to anchor the end portion of the torsion rod.

In some aspects, the techniques described herein relate to a tailgate assembly, further including: a cargo bed access opening between a driver side section and a passenger side section of the frame subassembly, the hollow structural section extending between the driver side section and the passenger side section; and a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position.

In some aspects, the techniques described herein relate to a tailgate assembly, wherein the connection beam extends along a bottom of the cargo bed access opening.

In some aspects, the techniques described herein relate to a tailgate assembly, wherein the torsion rod is biased to assist a pivoting movement of the frame subassembly and the door subassembly from a tailgate open position to a tailgate closed position.

In some aspects, the techniques described herein relate to a tailgate assembly, wherein the frame subassembly and the door subassembly pivot together about a horizontally extending axis back and forth between a tailgate open position and a tailgate closed position, wherein the door subassembly pivots relative to the frame subassembly about a vertically extending axis back and forth between a door open position and a door closed position.

In some aspects, the techniques described herein relate to a tailgate assembly, wherein the first brace and the second brace each have a C-shaped cross-sectional profile.

In some aspects, the techniques described herein relate to a tailgate assembly, wherein the first brace and the second brace overlap with each other when placed adjacent to each other to provide the connection beam with the hollow structural section.

In some aspects, the techniques described herein relate to a tailgate assembly, wherein the torsion rod anchor provides an entire circumferential perimeter of the rod-receiving opening.

In some aspects, the techniques described herein relate to a tailgate assembly, wherein the torsion rod anchor includes no more than one piece.

In some aspects, the techniques described herein relate to a tailgate assembly, wherein the torsion rod anchor is received entirely within the hollow structural section.

In some aspects, the techniques described herein relate to a tailgate assembly, wherein the rod-receiving opening includes a planar side that aligns with a planar portion within the end portion of the torsion rod.

In some aspects, the techniques described herein relate to a tailgate assembly, wherein the torsion rod anchor is a polymer-based material.

In some aspects, the techniques described herein relate to a tailgate assembly, further including a set screw that engages the torsion rod anchor and extends partially into the rod-receiving opening to secure the end portion of the torsion rod within the rod-receiving opening.

In some aspects, the techniques described herein relate to a tailgate assembly, further an anchoring fastener that secures the torsion rod anchor directly to the connection beam.

In some aspects, the techniques described herein relate to a tailgate assembly, wherein the connection beam includes an access opening to provide access to the anchoring fastener.

In some aspects, the techniques described herein relate to a tailgate torsion rod anchoring method, including: positioning a torsion rod anchor within a hollow structural section provided by a connection beam of a tailgate; and receiving an end portion of a torsion rod within a rod-receiving opening of the torsion rod anchor to anchor the end portion of the torsion rod.

In some aspects, the techniques described herein relate to a tailgate torsion rod anchoring method, further including securing the torsion rod anchor directly to the connection beam.

In some aspects, the techniques described herein relate to a tailgate torsion rod anchoring method, further including assisting a pivoting of the tailgate using the torsion rod.

In some aspects, the techniques described herein relate to a tailgate torsion rod anchoring method, wherein the torsion rod is at least partially disposed within the hollow structural section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures, that accompany the detailed description can be briefly described as follows.

DETAILED DESCRIPTION

Figure 1:
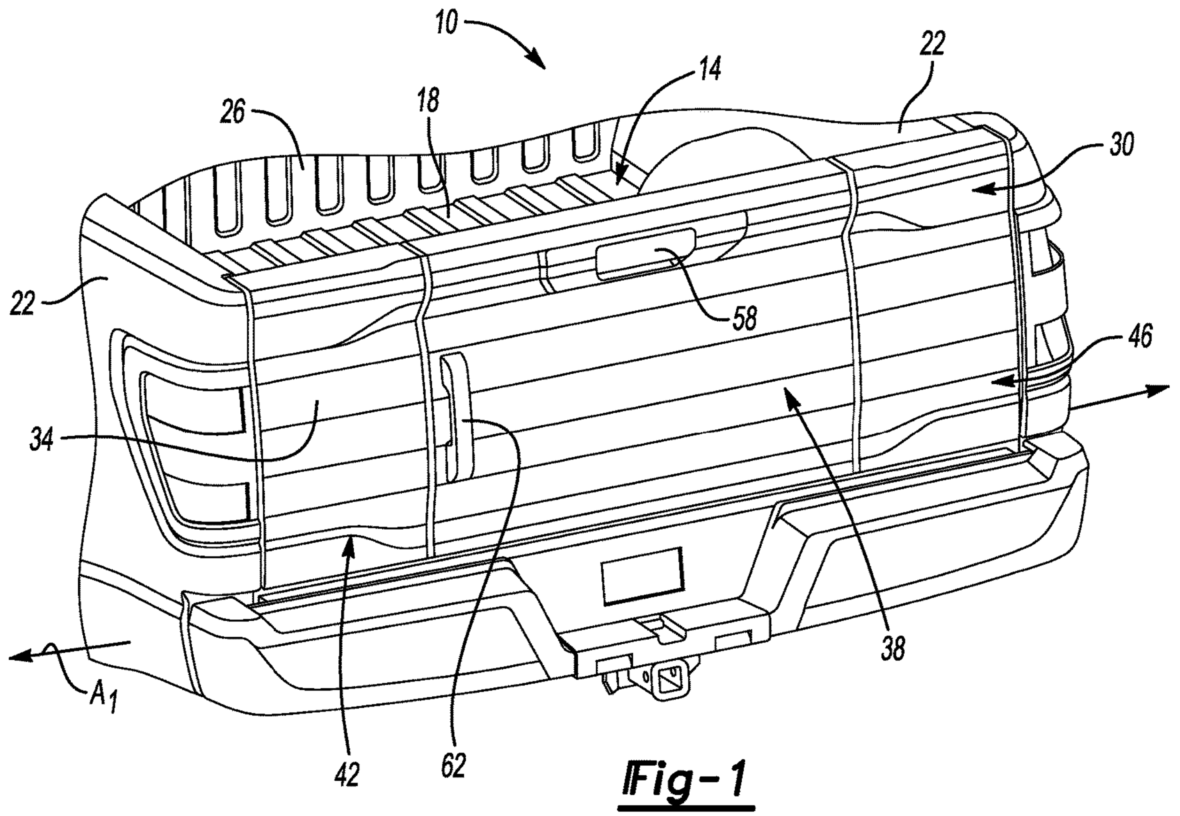
FIG. 1 is a rear perspective view of a motor vehicle equipped with a cargo space and a tailgate assembly positioned in a tailgate closed position relative to the cargo space.

This disclosure details exemplary tailgate assemblies having torsion rods and, in particular, anchors for those torsion rods. The tailgate assemblies can include a frame subassembly and a door subassembly that pivot together about a horizontal tailgate axis. The door subassembly can also pivot relative to the frame assembly about a vertical door axis.

FIGS. 1-4 illustrate selected portions of a motor vehicle 10 that includes a cargo space for storing and/or hauling cargo. In the illustrated embodiment, the vehicle 10 is a pickup truck and the cargo space is established by a cargo bed 14 of the pickup truck. While a pickup truck with a cargo bed is specifically depicted and referenced herein, other vehicles having other types of cargo spaces could also benefit from the teachings of this disclosure. The vehicle 10 could be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 14 is generally rearward of a passenger cabin (not shown) of the vehicle 10 and includes a floor 18 extending between a pair of longitudinally extending sidewalls 22, a laterally extending front wall 26, and a tailgate assembly 30. The overall size, shape, and configuration of the cargo bed 14 are not intended to limit this disclosure.

The tailgate assembly 30 can be considered a Multi-Axis Tailgate that includes, among other things, a frame subassembly 34 and a door subassembly 38. The frame subassembly 34, in the exemplary embodiment, includes a driver side section 42, a passenger side section 46, and a connection beam 50 connecting the driver side section 42 and the passenger side section 46. The door subassembly 38 may sometimes be referred to as a "swing gate subassembly." The door subassembly 38 is pivotably coupled to the passenger side section 46 and latches to the driver side section 42 when closed. At least one hinge assembly 54 is used to pivotably connect the door subassembly 38 to the passenger side section 46. In another example, the door subassembly 38 is pivotably coupled to the driver side section 42 and latches to the passenger side section 46.

Figure 2:
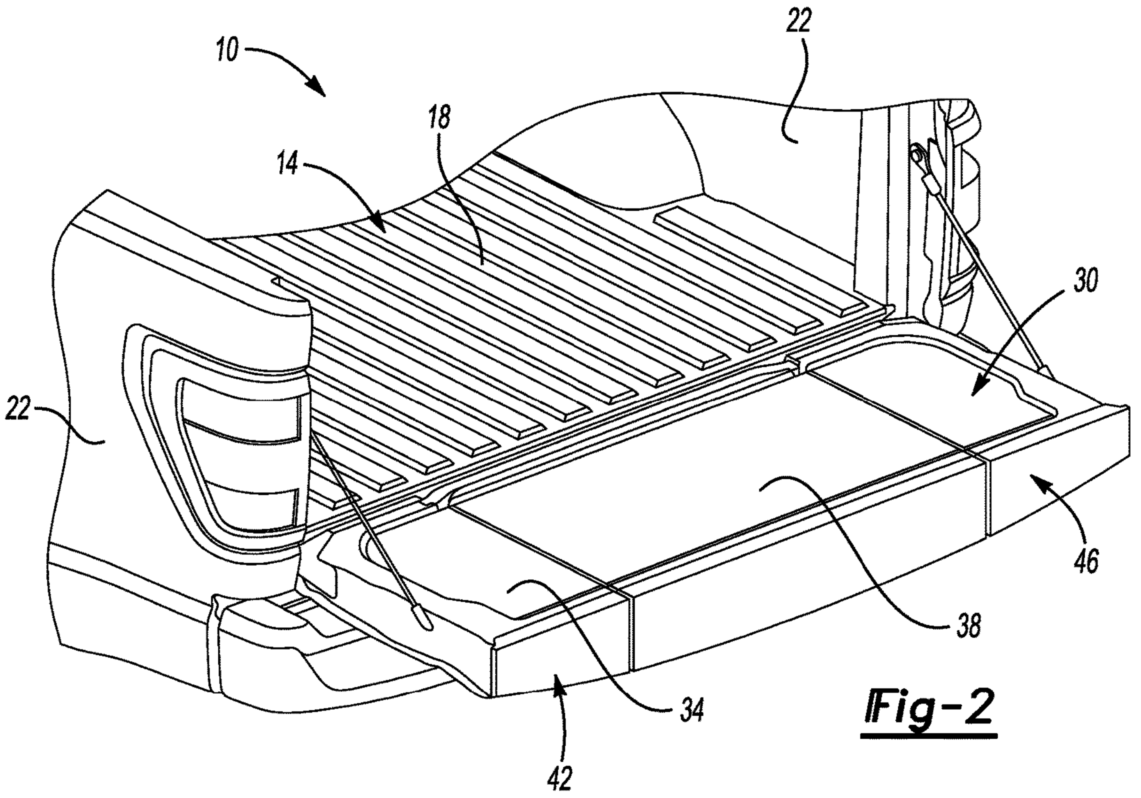
FIG. 2 illustrates the tailgate assembly of FIG. 1 in a tailgate open position.

The tailgate assembly 30 is pivotable about a first axis $A_1$ relative to the cargo bed 14 back-and-forth between a tailgate closed position shown in FIG. 1 and a tailgate open position shown in FIG. 2. The tailgate assembly 30 may be moved from the tailgate closed position to the tailgate open position in response to grasping actuating a first handle 58 of the tailgate assembly 30, for example. The tailgate assembly 30 is vertically aligned when in the tailgate closed position and thus generally encloses an end of the cargo bed 14 that is opposite from the front wall 26, and the tailgate assembly 30 is horizontally aligned when in the tailgate open position and thus generally allows access to the cargo bed 14. Vertical and horizontal, for purposes of this disclosure, are with reference to ground in the ordinary orientation of the vehicle 10 during operation.

The door subassembly 38 of the tailgate assembly 30 is in a door closed position and is latched to the frame subassembly 34 when the frame subassembly 34 and the door subassembly 38 are pivoted between the tailgate closed position and the tailgate open position. Thus, the frame subassembly 34 and the door subassembly 38 pivot together as a unit when the tailgate assembly 30 is transitioned back and forth between the tailgate closed position and the tailgate open position.

Figure 3:
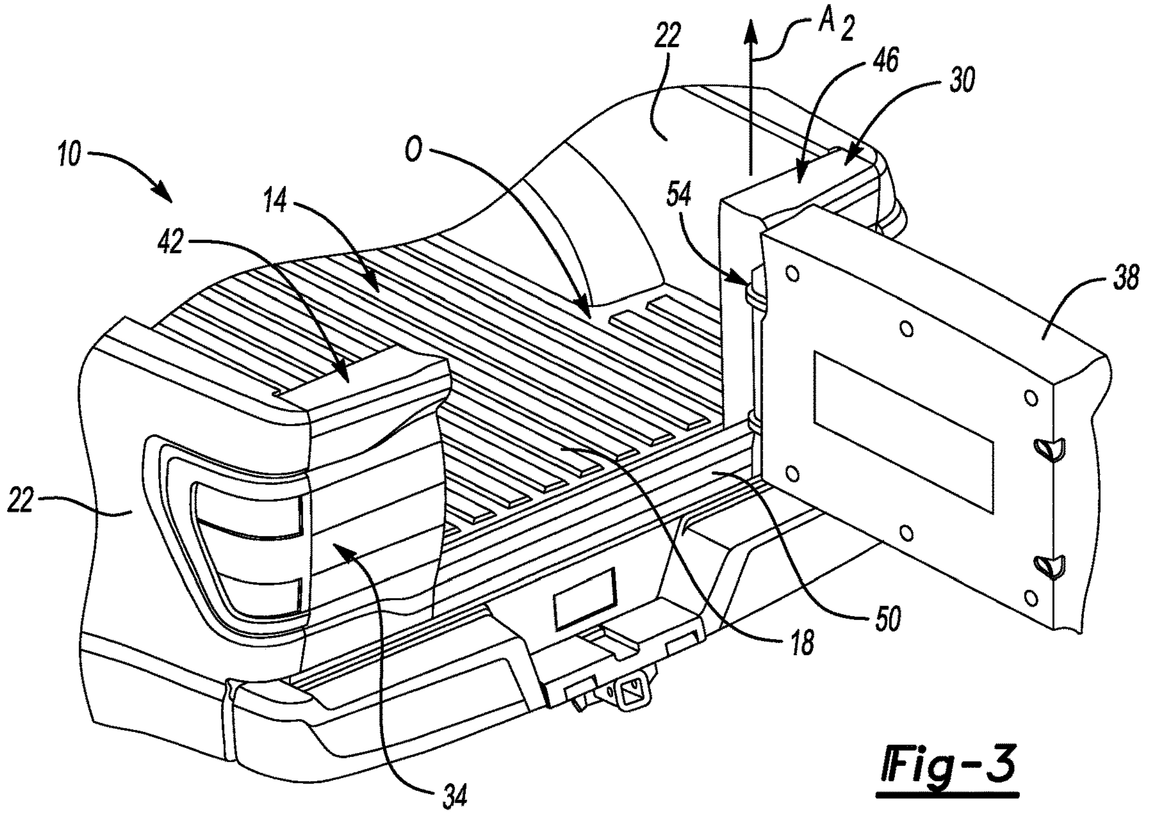
FIG. 3 illustrates a door subassembly of the tailgate assembly of FIG. 1 in a door open position.
Figure 4:
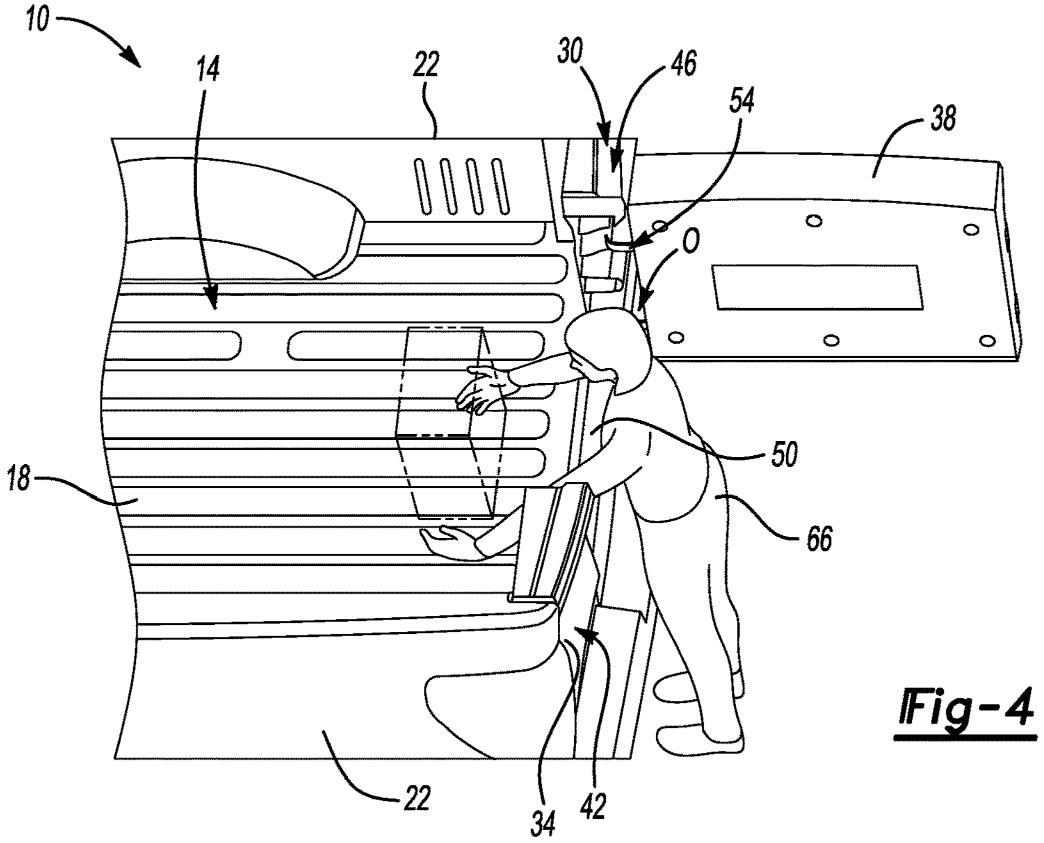
FIG. 4 is a rear and top view of the tailgate assembly and the door subassembly of FIG. 3.
Figure 5:
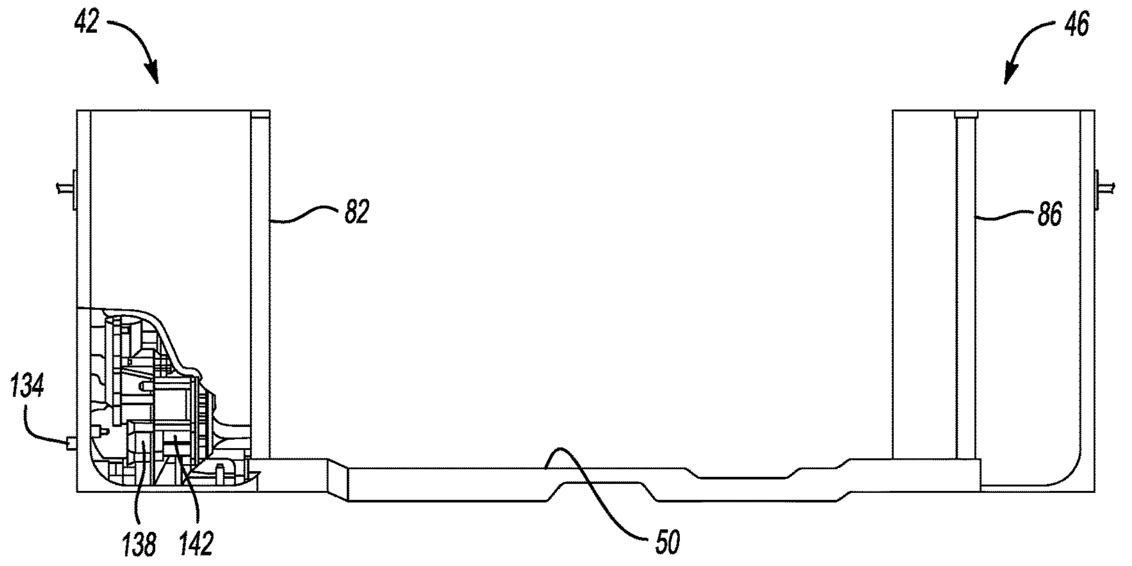
FIG. 5 is an view of a frame subassembly from the tailgate assembly of FIG. 1 with selected portions removed.
Figure 7:
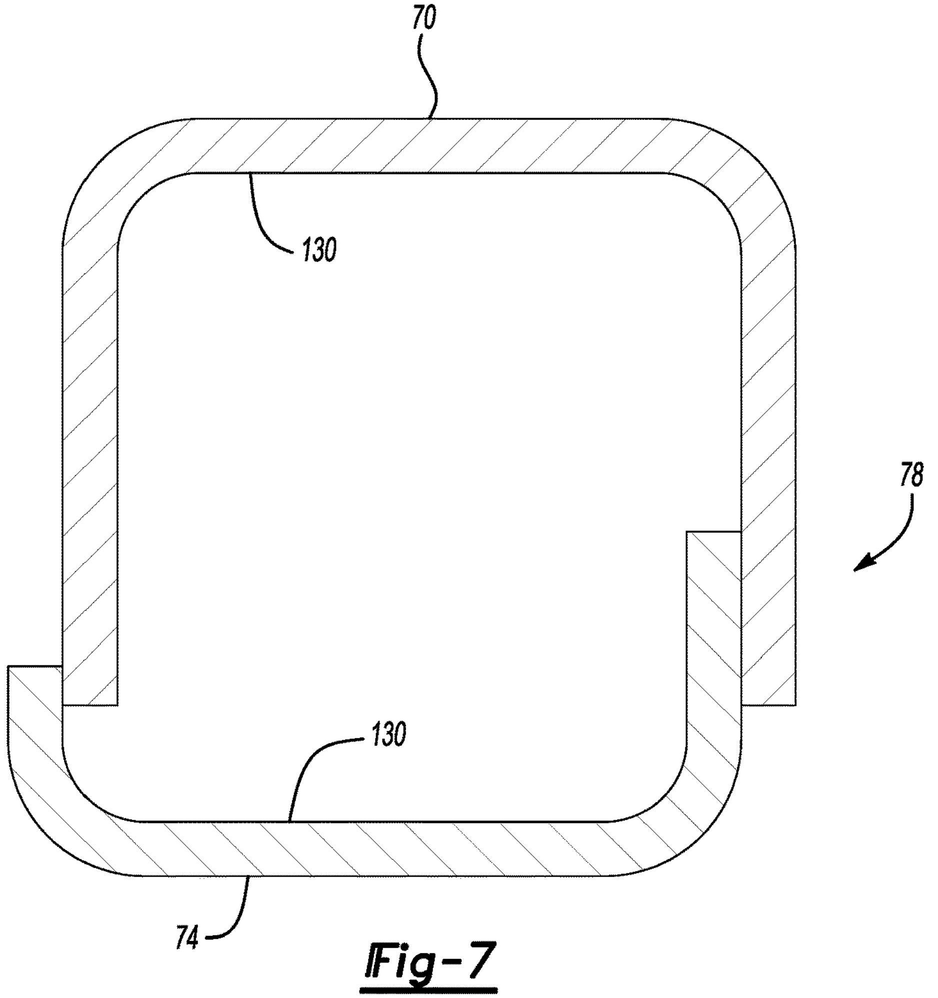
FIG. 7 illustrates a section view at line 7-7 in FIG. 6.
Figure 6:
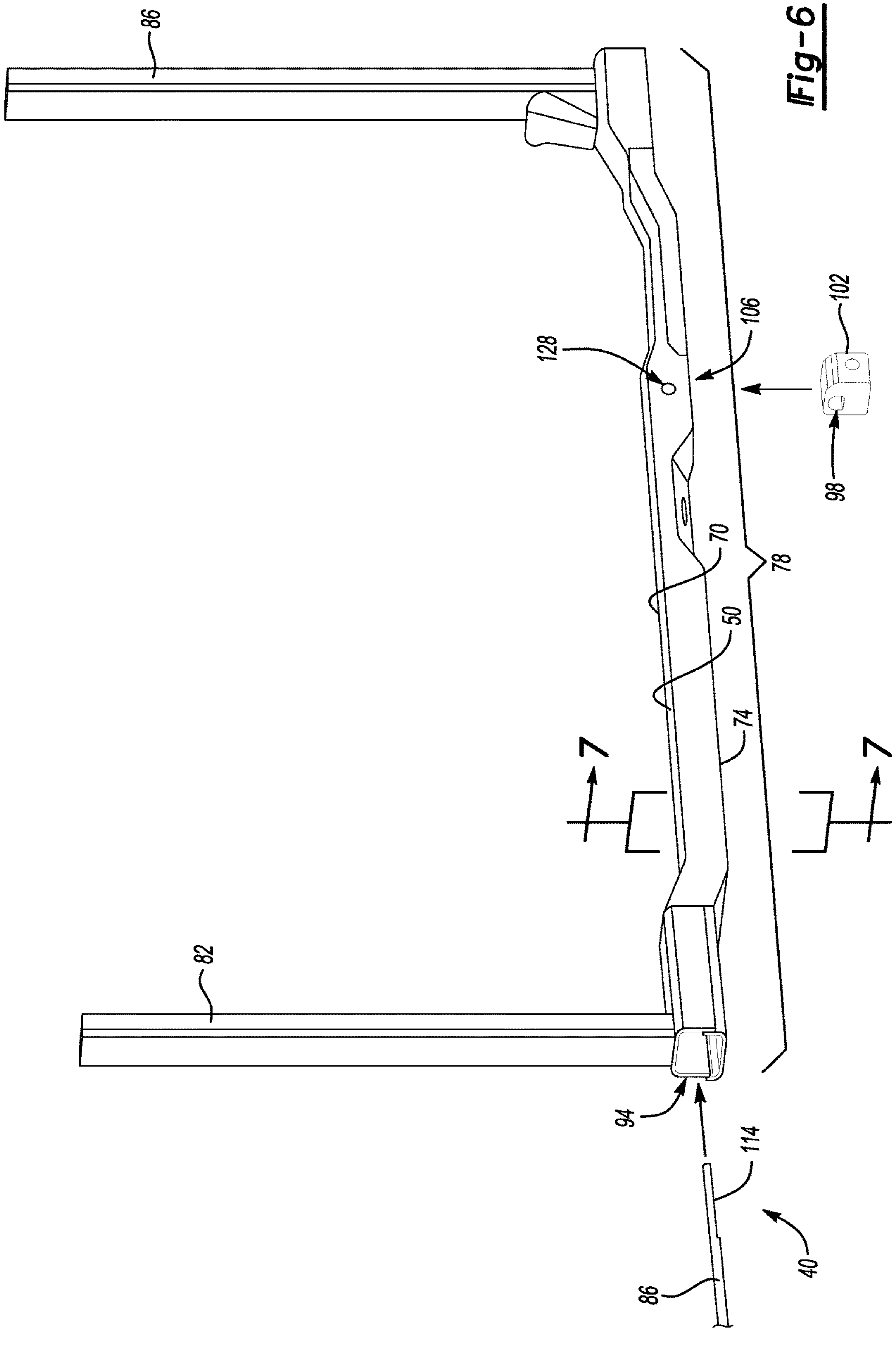
FIG. 6 illustrates a perspective view of a connection beam from the tailgate assembly of FIG. 1 with a torsion rod and torsion rod anchor in an uninstalled position.
Figure 8:
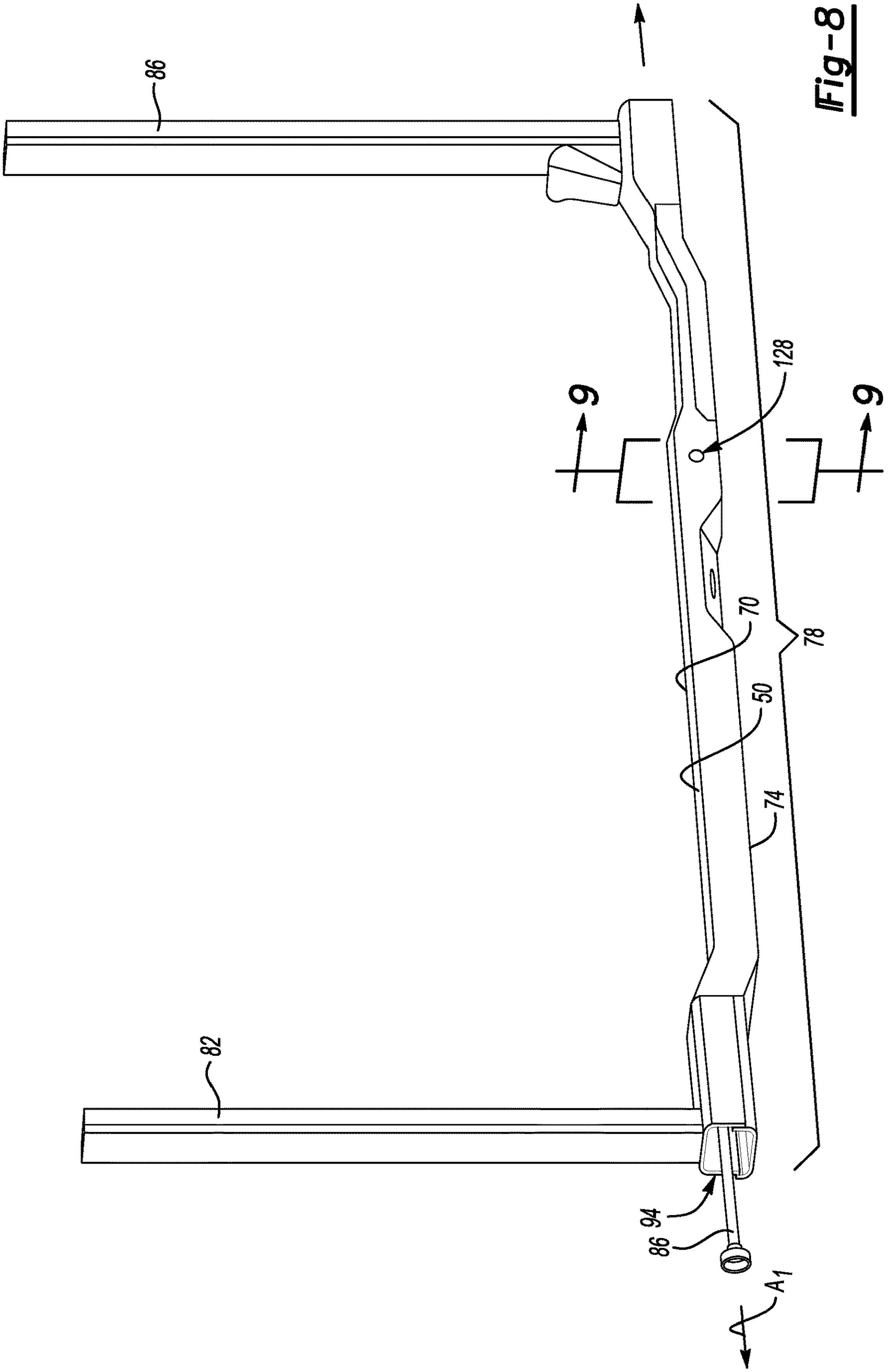
FIG. 8 illustrates a perspective view of the connection beam from the tailgate assembly of FIG. 1 with the torsion rod and the torsion rod anchor installed.
Figure 9:
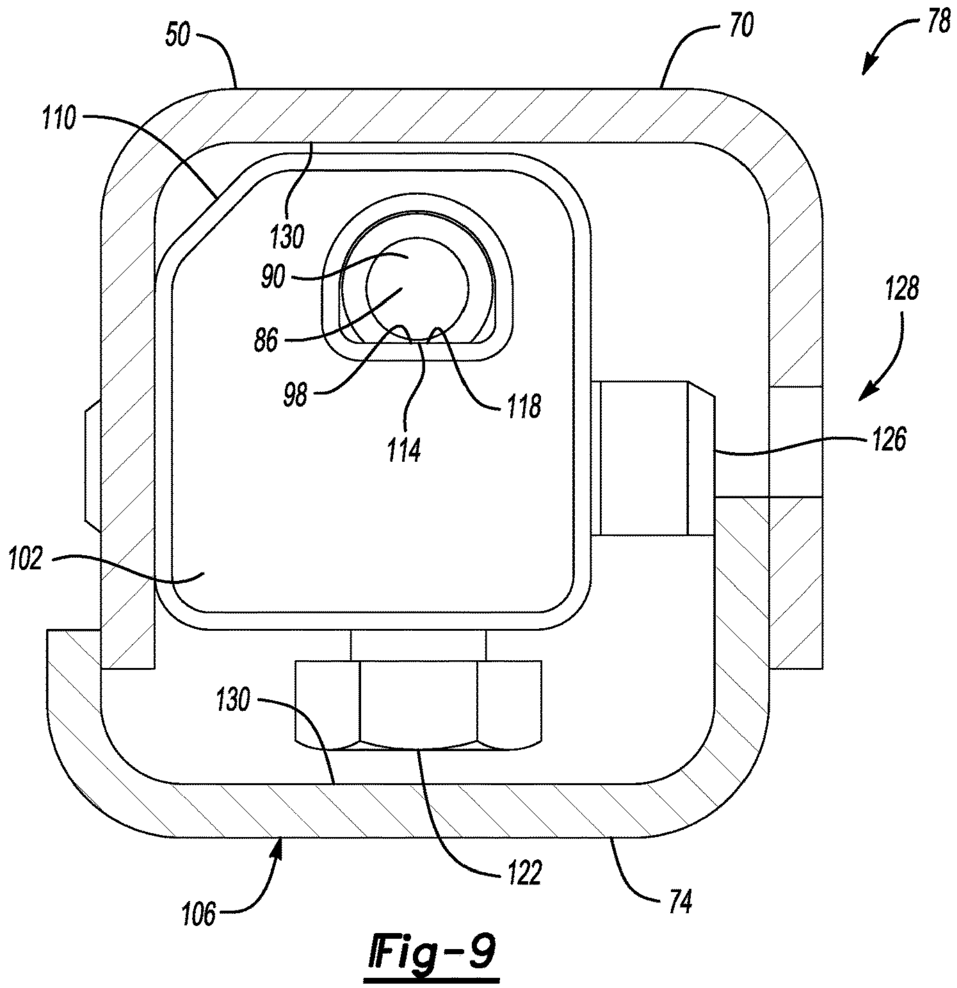
FIG. 9 illustrates a section view at line 9-9 in FIG. 8.
Figure 10:
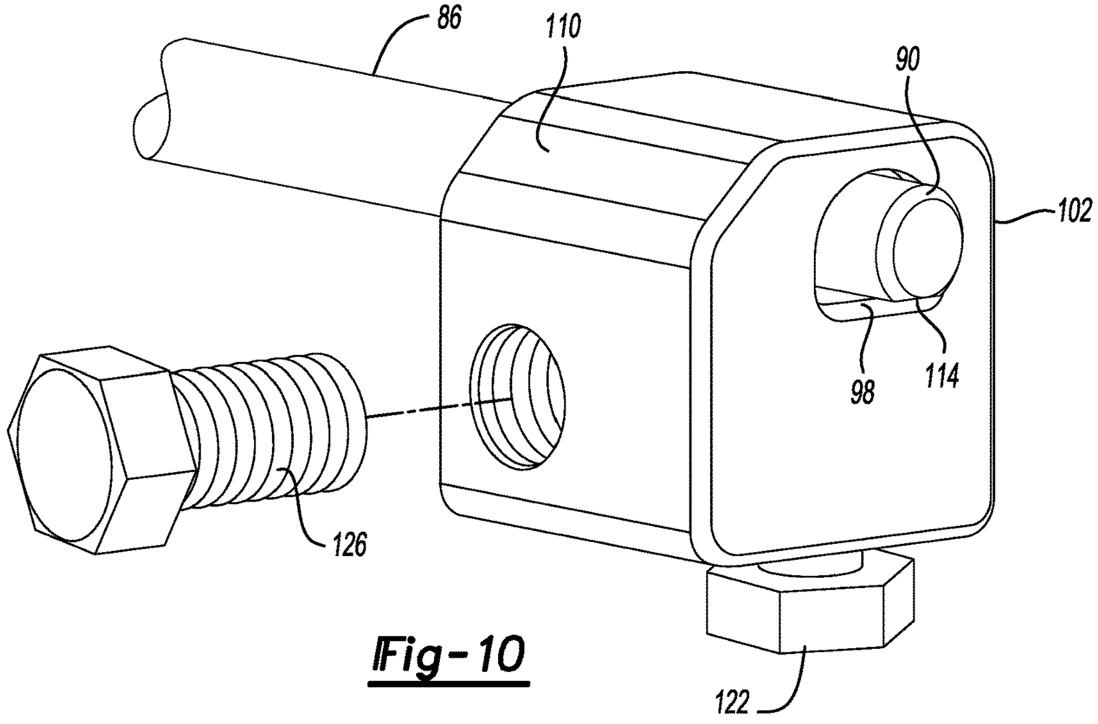
FIG. 10 illustrates a perspective view of an end portion of the torsion rod received within a rod receiving opening of the torsion rod anchor.
Figure 11:
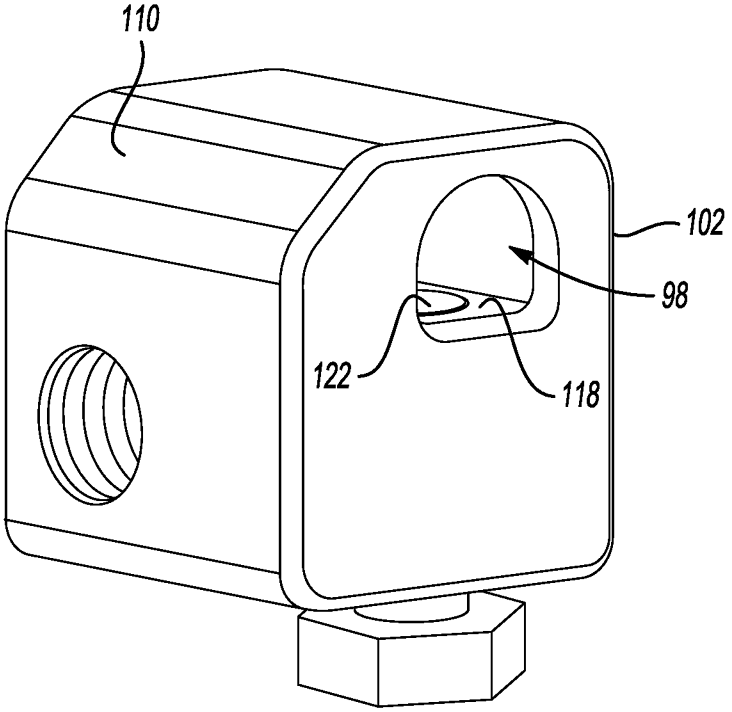
FIG. 11 illustrates a perspective view of the torsion rod anchor.

When in the tailgate closed position, the door subassembly 38 is pivotable relative to the frame subassembly 34 about a second axis $A_2$ between the door closed position shown in FIG. 1 and a door open position shown in FIG. 3. In an embodiment, the first axis $A_1$ is a horizontally extending axis, and the second axis $A_2$ is transverse to the first axis A1 and is a vertically extending axis. The door subassembly 38 may be moved between the door closed position and the door open position by grasping and actuating a second handle 62 (see FIG. 1) of the tailgate assembly 30, for example.

The door subassembly 38 provides a cargo bed access opening O when moved to the door open position. The cargo bed access opening is disposed between the driver side section 42 and the passenger side section 46 of the frame subassembly.

In an embodiment, the cargo bed access opening O extends vertically downward at least as far as the floor 18 of the cargo bed 14. A user 66 (see FIG. 4) can access the cargo bed 14 through the cargo bed access opening O when the door subassembly 38 is in the door open position. Placing the door subassembly 38 in the door open position allows the user 66 to move closer to the cargo bed 14 than, for example, when the tailgate assembly 30 is positioned in the tailgate open position of FIG. 2. The cargo bed access opening O can also provide clearance for the user 66 to enter the cargo bed 14 to either load or retrieve an item of cargo (see FIG. 4).

With reference now to FIGS. 5-11 and continuing reference to FIGS. 1-4, the frame subassembly 34 includes a first brace 70 placed adjacent a second brace 74 to provide a connection beam 78 that has a hollow structural section. The first brace 70 and the second brace 74 each have a C-shaped cross-sectional profile.

In this example, the first brace 70 and the second brace 74 slightly overlap with one another when placed adjacent to each other to provide the hollow structural section. The first brace 70 and the second brace 74 can be joined together using welds, for example.

The frame subassembly 34 further includes a driver side upright 82 of the driver side section 42, and a passenger side upright 86 of the passenger side section 46. The driver side upright 82 and the passenger side upright 86 extend from opposing ends of the connection beam 78.

The bottom of the cargo bed axis opening O is a vertical bottom when the tailgate assembly 30 is in a closed position. The connection beam 78 extends along a bottom of the cargo bed axis opening O to connect the driver side section 42 of the frame subassembly 34 to the passenger side section 46 of the frame subassembly 34.

The connection beam 78 houses a torsion rod 86 that is biased to assist the pivoting movement of the door subassembly 24 and the frame subassembly 22 about the axis $A_1$. The torsion rod 86 is at least partially received within the connection beam 78 and is biased to assist the pivoting movement.

During assembly, an end portion 90 of the torsion rod 86 is moved into the hollow structural section through an open end 94 of the connection beam 78 and then into a rod-receiving opening 98 of a torsion rod anchor 102. The torsion rod anchor 102 can be a polymer-based material.

The torsion rod anchor 102 is positioned within the hollow structural section when receiving the end portion 90 of the torsion rod 86. The rod-receiving opening 98 that receives the end portion 90 of the torsion rod 86 can have tapered edges to guide the end portion 90 of the torsion rod 86 into the rod-receiving opening 98.

The torsion rod anchor 102 can be moved into the hollow structural section through an access opening 106 provided within, in this example, the second brace 74. A locator feature 110 can be incorporated into the torsion rod anchor 102 to facilitate proper positioning within the hollow structural section. In this example, the locator feature 110 is an angled face of the torsion rod anchor 102 that, when properly positioned within the hollow structural section, interfaces with a corner area of the connection beam 50.

In this example, the entire torsion rod anchor 102 is positioned within the hollow structural section. in particular, the torsion rod anchor 102 is received entirely within the hollow structural section. In another example, an area of the torsion rod anchor 102 could extend outside the hollow structural section.

The example torsion rod anchor 102 provides an entire circumferential perimeter of the rod-receiving opening 98 with a single piece. That is, two pieces are not joined to provide the rod-receiving opening 98 with a portion of the rod receiving opening 98 established by one piece and the remaining portion established by the other piece.

To align the torsion rod 86 circumferentially within the rod-receiving opening 98, a planar portion 114 within the end portion 90 of the torsion rod 86 is circumferentially aligned with a planar side 118 of the rod-receiving opening 98. In this example, the end portion 90 cannot be received within the rod-receiving opening 98 unless the planar portion 114 of the torsion rod 86 is circumferentially aligned with the planar side 118 of the rod-receiving opening 98. Further, once the end portion 90 is inserted into the rod-receiving opening 98, the planar side 118 blocks rotation of the end portion 90 of torsion rod 86 within the rod-receiving opening 98 relative to the torsion rod anchor 102.

In this example, a set screw 122 engages the torsion rod anchor 102 and extends partially into the rod-receiving opening 98 to secure the end portion 90 of the torsion rod 86 to the torsion rod anchor 102 within the rod-receiving opening 98. The set screw 122 can be accessed through the access opening 106 during assembly. The set screw 122 can help to block the end portion 90 of the torsion rod 86 from withdrawing from the rod-receiving opening 98, and can help to block rotation of the end portion 90 of the torsion rod 86 within the rod-receiving opening 98 relative to the torsion rod anchor 102.

In this example, an anchoring fastener 126, here a bolt, secures the torsion rod anchor 102 directly to the connection beam 50 when the torsion rod anchor 102 is installed. The anchoring fastener 126 extends through an opening 128 in the first brace 70 or the second brace 74 to engage the torsion rod anchor 102. The anchoring fastener 126 can be accessed through the opening 128 during assembly.

In some examples, a locator feature, such as a locating pin, can extend from the torsion rod anchor 102 into an opening provided by the first brace 70, the second brace 74, or both. The locator feature can help to, among other things, properly align the torsion rod anchor 102 within the hollow structural section during assembly. The locator feature can help to, among other things, prevent movement (e.g. rotation) of the torsion rod anchor 102 within the hollow structural section as the anchoring fastener 126 is torqued down to secure the torsion rod anchor 102 directly to the connection beam 50.

As the torsion rod anchor 102 is secured to the connection beam 78, and the end portion 90 of the torsion rod 86 is blocked from rotating relative to the torsion rod anchor 102, the end portion 90 of the torsion rod 86 rotates together with the connection beam 78 as the tailgate assembly 30 is moved between the tailgate opening position and the tailgate closed position.

Within the hollow structural section of the connection beam 78, the torsion rod 86 may be spaced from the inner surfaces 130 of the first brace 70 and the second brace 74 with at least one isolator (not shown). The isolator can maintain a spacing between the torsion rod 86 and the inner surfaces 130 of the connection beam 78. The isolator can be rubber.

While not required, the example tailgate assembly 30 includes an actuator system that can pivot the tailgate assembly 30 (i.e., the door subassembly 38 and the frame subassembly 34) about the first axis $A_1$ back and forth between the tailgate closed position shown in FIG. 1 and the tailgate open position shown in FIG. 2. To pivot the tailgate assembly 30, the actuator system rotates relative to a pivot rod 134 (FIG. 5) that is rotatably fixed to the sidewall 22.

The actuator system, can include a clutch 138 and a motor 142. The motor 142 is activated to drive the pivot rod 134 through the clutch 138. The rotation can force the pivoting movement of the tailgate assembly 30.

Features of some of the disclosed examples include a torsion rod and torsion rod anchor that can be installed within a connection rod having a hollow structural section. In past tailgates that do not house a torsion rod within a connection member, multi-piece torsion rod anchors have been used. Such multi-piece designs present assembly challenges if used with a connection beam having a hollow structural section. Bolt heads, for example, could potentially interfere with pivoting of the door subassembly, pivoting of the tailgate assembly, or both.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A tailgate assembly, comprising:

a frame subassembly for a tailgate, the frame subassembly having a first brace placed adjacent to a second brace to provide a connection beam with a hollow structural section;

a torsion rod at least partially disposed within the hollow structural section;

a torsion rod anchor having a rod-receiving opening that receives an end portion of the torsion rod to anchor the end portion of the torsion rod; and a set screw that engages the torsion rod anchor and extends partially into the rod-receiving opening to secure the end portion of the torsion rod within the rod-receiving opening, the set screw disposed entirely within the hollow structural section.

2. The tailgate assembly of claim 1, further comprising:

a cargo bed access opening between a driver side section and a passenger side section of the frame subassembly, the hollow structural section extending between the driver side section and the passenger side section; and a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position.

3. The tailgate assembly of claim 2, wherein the connection beam extends along a bottom of the cargo bed access opening.

4. The tailgate assembly of claim 2, wherein the frame subassembly and the door subassembly pivot together about a horizontally extending axis back and forth between a tailgate open position and a tailgate closed position, wherein the door subassembly pivots relative to the frame subassembly about a vertically extending axis back and forth between a door open position and a door closed position.

5. The tailgate assembly of claim 2, wherein the first brace and the second brace each have a C-shaped cross-sectional profile.

6. The tailgate assembly of claim 4, wherein the first brace and the second brace overlap with each other when placed adjacent to each other to provide the connection beam with the hollow structural section.

7. The tailgate assembly of claim 1, wherein the torsion rod anchor provides an entire circumferential perimeter of the rod-receiving opening.

8. The tailgate assembly of claim 1, wherein the torsion rod anchor includes no more than one piece.

9. The tailgate assembly of claim 1, wherein the torsion rod anchor is received entirely within the hollow structural section.

10. The tailgate assembly of claim 1, wherein the rod-receiving opening includes a planar side that aligns with a planar portion within the end portion of the torsion rod.

11. The tailgate assembly of claim 1, wherein the torsion rod anchor is a polymer-based material.

12. The tailgate assembly of claim 1, further comprising an anchoring fastener that secures the torsion rod anchor directly to the connection beam, wherein the connection beam includes an opening to provide access to the anchoring fastener.

13. A tailgate assembly, comprising:

a frame subassembly for a tailgate, the frame subassembly having a first brace placed adjacent to a second brace to provide a connection beam with a hollow structural section;

a torsion rod at least partially disposed within the hollow structural section;

a torsion rod anchor having a rod-receiving opening that receives an end portion of the torsion rod to anchor the end portion of the torsion rod;

a set screw that engages the torsion rod anchor and extends partially into the rod-receiving opening to secure the end portion of the torsion rod within the rod-receiving opening, the set screw disposed entirely within the hollow structural section; and an anchoring fastener that secures the torsion rod anchor directly to the connection beam, wherein the connection beam includes a beam opening to provide access to the anchoring fastener, wherein the beam opening is a first beam opening, and wherein the connection beam further comprises a second beam opening to provide access to the set screw.

14. The tailgate assembly of claim 13, wherein the anchoring fastener and the set screw are oriented transverse to one another.

15. A tailgate assembly, comprising:

a connection beam of a frame subassembly, the connection beam defining a hollow structural section;

a torsion rod disposed at least partially within the hollow structural section;

a torsion rod anchor positioned within the hollow structural section and including a rod-receiving opening configured to receive an end portion of the torsion rod, wherein the torsion rod anchor provides an entire circumferential perimeter of the rod-receiving opening, wherein the torsion rod anchor comprises no more than one piece;

an anchoring fastener that secures the torsion rod anchor to the connection beam, the anchoring fastener having a head disposed within the hollow structural section; and a set screw engaged with the torsion rod anchor to secure the end portion of the torsion rod relative to the torsion rod anchor, the set screw being disposed within the hollow structural section.

16. The tailgate assembly of claim 15, further comprising:

a cargo bed access opening between a driver side section and a passenger side section of the frame subassembly, the hollow structural section extending between the driver side section and the passenger side section; and a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position.

17. The tailgate assembly of claim 15, wherein the anchoring fastener secures the torsion rod anchor to the connection beam along a first axis, and the set screw secures the torsion rod relative to the torsion rod anchor along a second axis that is transverse to the first axis.

* * * * *